Patented Dec. 17, 1929

1,739,645

UNITED STATES PATENT OFFICE

TREADWAY B. MUNROE AND ELBERT C. LATHROP, OF CHICAGO, ILLINOIS; SAID LATHROP ASSIGNOR TO SAID MUNROE

PRESERVATION OF FIBERS FOR PULP MAKING PURPOSES

No Drawing.   Application filed June 8, 1927.   Serial No. 197,506.

This invention relates to a method of preserving bagasse fibers, corn stalk fibers, sorghum fibers or other fibers, suitable for use in the production of pulp to be used for fiber wallboard manufacture, by a process of storage and has for its object to provide such a process as will be more certain in its action and more economical in result than those hitherto proposed.

With these and other objects in view the invention consists of the novel steps and combinations of steps constituting the process all as will be more fully hereinafter disclosed and particularly pointed out in the claims.

In order that the precise invention may be more clearly understood it is said:

Bagasse fibers as they leave the sugar mill contain varying but small amounts of unextracted sugar together with carbohydrate gums not soluble in water. The water content of the raw bagasse is substantially 50% depending on the particular actions to which it was subjected before leaving the sugar mill. In the case of sorghum, corn stalks and other fibers, the moisture content will vary depending on conditions immediately previous to baling, but in general, with the type of balers now in use, the moisture content of such fibers will not be greater than 70%. If the bagasse or other fibers were immediately dried after leaving the mill, very little if any change in the mass would be subsequently brought about by fermentation actions, since it is well known that micro-organisms require water in order to grow and carry on their processes of metabolism known as fermentation.

But such drying of bagasse and other fibrous material is found to be too costly to be practicable. When masses of bagasse or analogous fibers containing moisture on the other hand are baled and piled or are piled loose, alcohol, acetic, and lactic acid fermentations begin within a day or a few days thereafter, and it has been hitherto practically impossible to prevent said fermentations except by drying or by treating with chemical processes, neither of which have been heretofore commercially feasible.

When bagasse and similar fibers are baled under conditions where the material is later stored in piles, fermentation takes place and if the bales are stacked closely together in piles, it has been found that this action causes the generation of considerable heat which may extend to a point where the fiber is burned by the high temperature, or danger of spontaneous combustion is encountered. In U. S. Patent 1,572,539 granted to E. C. Lathrop and T. B. Munroe, dated February 6, 1926, and entitled "Preparing and preserving fibers for pulp making purposes", there is disclosed a process whereby these bales are piled in such a way that the temperature built up inside of the piles brings about a substantial pasteurization of the mass limiting or completely stopping the fermenation processes after a period, thus resulting in the more complete preservation of the baled fiber.

On the other hand, this invention relates to a method of handling the bales after they are made, in such a fashion that no substantial heating up of the material in these bales takes place, due to the exclusion and elimination of oxygen from the mass of fibers, and due to the fact that no precipitation of moisture comes about to increase the original moisture content of the fibers in the bales. Thus the fermentation is limited and is of such nature that only gums and carbohydrate material, not wanted or required in the pulp making process, will be consumed by said fermentation.

This invention is not to be confused with the well known ensilage fermentation which is used to produce sweet forage for animals by placing the green forage crop in silos, and covering from the air. In this ensilage process the moisture content of the fibers entering the silo is in the neighborhood of 80%; the sugar and starch content of the materials entering the silo is also higher than in the mature dry stalks, except in the case of sugar cane and sorghums which are not in use extensively for ensilage. In the case of matured fibers with which this invention is concerned, the moisture content is lower, as is also the sugar content of the fibers. It is obvious that the fibers from sugar cane bagasse and sorghums which will be baled will be deprived almost completely of their sugary content by the milling process of these materials prior to baling.

Neither is this process to be confused with the process described in U. S. Patent 1,572,540 granted to E. C. Lathrop and T. B. Munroe dated February 19, 1926, entitled "Method of preserving fibers for pulp making purposes" whereby bacterial pickling is brought about by saturating the fibers with water as they are piled.

The principles involved in this invention comprise taking the bales of fiber immediately after baling, or before the initial fermentation process of converting the more soluble carbohydrates to alcohol and acids has stopped, and placing these bales in a suitable housing adapted for the elimination of air, or in other words the bales are placed in a structure having walls adapted to prevent, or substantially prevent, the passage of air therethrough. The bales are placed as close together as possible in layers and the crevices, openings or interstices, then filled with loose fiber by crowding this fiber down into such openings. After one layer of bales is formed, a light layer of loose fiber is scattered over the upper surface and another layer of bales is laid down in the manner aforesaid and so on, layer after layer, the openings and interstices being filled with loose fiber until the building is entirely full of bales. After this structure is filled with bales a suitable roof or covering is superimposed thereover to exclude rain, or a light layer of chemicals, as described in a copending application, may be sprinkled over the top layer of bales.

Under the conditions just described it will be found that the atmosphere in the bales, and in the structure in which the bales have been placed, is rapidly changed from one containing the usual amount of oxygen as found in the air, to one in which the oxygen is substantially eliminated or is reduced to amounts less than 2%, this oxygen being replaced by carbon dioxide. Thus fermentations which would require atmospheric oxygen to proceed are practically stopped. This does not, however, exclude fermentations which can take place under anaerobic conditions such as the production of alcohol from sugar, the formation of lactic acids and similar types of fermentations. It will be found that when such a mass of fiber is removed from said structure, after a period of storage of as long as nine months, the bales will still have an odor of alcohol and that when these bales are exposed to the normal atmosphere acetic acid fermentation will again begin.

A record of the temperature from day to day in such a mass of stored bagasse will show that there has been no heating up to a temperature which would bring about a condition of pasteurization. It will further be found that the fiber has undergone substantially no change in strength, or color, or quality, or stiffness, or any of its mechanical properties from the day that the fiber was placed in the structure under the conditions disclosed.

This invention is not to be confused with silo storage wherein the material when stored is relatively green or unmatured vegetation containing 80% and upwards of moisture, and sugars considerably in excess of the few residual per cent found in bagasse. The function of silo storage is to provide relatively fresh forage for cattle during the fall and winter seasons, and in silo storage the fermentation action produced is largely a lactic acid fermentation and the result desired is particularly the preservation of the albumens and carbohydrates of the forage. In order that the conditions may be proper to obtain the desired fermentation, should the forage have a moisture content less than normal when harvested, water is added as it is stored, in order that the moisture content may be proper for the propagation of lactic acid fermentation. In some instances stover or matured stalks have been stored in silos for forage but it is found necessary in order that such material may be of any value that its water content must be raised to 80% or more and that as the material is stored there must be added albuminous material such as blood, "stick", etc., whereby the conditions of storage are made such that the proper conditions will be present for the lactic acid fermentation. As distinguished from silo storage of fodder this process is not directed to preservation of albumen and the carbohydrates and the moisture percentage is such and is so maintained that the primary fermentation is alcoholic.

By this process it will thus be seen that the natural deterioration from undue fermentation of a mass of fibrous material stored for pulp making purposes having a high moisture content is prevented by first forming the fibrous mass into bales under pressure, then so stacking the bales in an enclosure as to exclude air therebetween, and lastly preventing air and additional moisture from reaching the pile of bales. By this method the fermentations will be stopped before the fibers are destroyed, by the lack of oxygen in the atmosphere surrounding the fibrous mass, and by the exclusion of additional moisture, the growth of micro-organisms is also stopped. Pasteurization is likewise prevented by the exclusion of both oxygen and additional moisture, which keeps the temperature of a pile below that point where the fibers would be destroyed. Further the fibrous material having a moisture content of as high as 70%, together with a small percentage of sugary and starchy matter, will in the presence of oxygen, not only set up fermentation action permitting the growth of micro-organisms, but there will be liberated carbondioxide. Therefore, by stacking the bales in close formation in an enclosure from which a circulation of air is excluded, the original oxygen content of the enclosure and bales is used in forming the carbondioxide, or in other words it may be said that the carbondioxide naturally produced by the fermentation action displaces a substantial proportion of the oxygen content of the mass of fibers. Since no oxygen is permitted to enter the enclosure, the oxygen content thereof is reduced to an amount insufficient to permit fermentation destructive to the fibers, and from tests it has been found that the oxygen content is reduced to 2% and less.

It is obvious that those skilled in the art may vary the steps of the procedure as above outlined within the scope of this invention and therefore it is not desired to be limited to the foregoing except as may be demanded by the claims.

What is claimed is:

1. The process of preventing the natural deterioration of a mass of fibrous material having a moisture content of 70% or less suitable for pulp making purposes which consists in forming said mass into bales under pressure; and stacking said bales in piles whereby they are freed of air.

2. The process of preventing the natural deterioration from undue fermentation of a mass of fibrous material having a moisture content of 70% or less suitable for pulp making purposes which consists in forming said mass into bales under pressure; and stacking said bales in piles whereby they are freed of air and protected from additional moisture sufficient to cause destructive fermentation.

3. The process of preventing the natural deterioration of a mass of fibrous material having a moisture content of 70% or less suitable for pulp making purposes which consists in forming said mass into bales under pressure; piling said bales in close formation; and excluding air and additional moisture from said piles.

4. The process of preventing the natural deterioration of a mass of fibrous material having a moisture content of 70% or less suitable for pulp making purposes which consists in forming said mass into bales under pressure; piling said bales in close formation by the addition of loose fibrous material to the openings therebetween; and excluding air and additional moisture from said piles.

5. The process of preventing the natural deterioration of a mass of fibrous material having a moisture content of 70% or less suitable for pulp making purposes which consists in forming said mass into bales under pressure; forming a pile of said bales; excluding air from between the bales in forming said pile; and preventing air from reaching said pile.

6. The method of preventing undue fermentation of a mass of fibrous material having a moisture content of 70% or less which consists in storing the same under pressure free from additional air.

7. The method of preventing undue fermentation of a mass of fibrous material having a moisture content of 70% or less which consists in storing the same under pressure free from additional air and additional moisture.

8. The method of preventing undue fermentation of a mass of fibrous material having a moisture content of 70% or less which consists in storing the same under pressure free from additional air whereby the fermentations will be stopped before the fibers are destroyed.

9. The method of preventing undue fermentation of a mass of fibrous material having a moisture content of 70% or less which consists in storing the same under pressure free from additional air and additional moisture sufficient to cause the continued growth of aerobic micro-organisms.

10. The method of preventing undue fermentation of a mass of fibrous material having a moisture content of 70% or less which consists in storing the same under pressure in an atmosphere containing an amount of oxygen insufficient to permit fermentation destructive to the fibers.

11. The method of preventing undue fermentation of a mass of fibrous material having a moisture content of 70% or less which consists in storing the same under pressure in an atmosphere containing an amount of oxygen (less than 2%) insufficient to permit fermentation destructive to the fibers.

12. The method of preventing undue fermentation of a mass of fibrous material having a moisture content of 70% or less which consists in storing the same under pressure and conditions preventing pasteurization.

13. The method of preventing undue fermentation of a mass of fibrous material having a moisture content of approximately 70% which consists in limiting the oxygen content in said mass to 2%.

14. The method of preventing undue fermentation of a mass of fibrous material having a moisture content of 70% or less which consists in limiting the oxygen content in said mass to 2% by the action of carbon dioxide.

15. The method of preventing undue fermentation of a mass of fibrous material having a moisture content of 70% or less which consists in limiting the oxygen content in said mass to 2% by the production of carbon dioxide during the fermentation.

16. The method of preventing undue fermentation of a mass of fibrous material having a moisture content of 70% or less which consists in reducing by displacement the oxygen content in said mass to an amount insufficient to permit fermentation destructive to the fibers.

17. The method of preventing undue fermentation of a mass of fibrous material having a moisture content of 70% or less which consists in storing said mass under conditions causing a natural reduction of the oxygen content in said mass whereby destructive fermentation of the fibers is substantially stopped.

18. The method of preventing undue fermentation of a mass of fibrous material having a moisture content of approximately 70% which consists in storing the same in an enclosure at the time rapid fermentation of sugars and starches contained therein takes place; displacing oxygen in the atmosphere of the enclosure to a content of 2% or less by the carbon dioxide produced during the fermentation; and maintaining the low oxygen content which is insufficient to permit fermentation destructive to the fibers.

19. The method of preventing destruction of a mass of fibrous material having a moisture content of 70% or less which consists in protecting said mass from access of free oxygen whereby anaerobic conditions are maintained preventing fermentation destructive of the fiber; and holding the moisture content of said mass below a definite point whereby growth of destructive fungi is prevented, the condition of fermentation not only assisting in preventing the growth of fungi by creating heat in said mass below the optimum temperature for the growth of fungi, but also maintaining the oxygen tension below the optimum for the growth of fungi.

In testimony whereof we affix our signatures.

TREADWAY B. MUNROE.
ELBERT C. LATHROP.